(12) United States Patent
Shieh et al.

(10) Patent No.: US 7,084,763 B2
(45) Date of Patent: *Aug. 1, 2006

(54) MULTIPLE SENSOR VEHICLE OCCUPANT DETECTION FOR AIR BAG DEPLOYMENT CONTROL

(75) Inventors: Shiuh-An Shieh, Alpharetta, GA (US); Gregory T. Thompson, Johnsborough, GA (US)

(73) Assignee: Elesys North American Inc., Suwanee, GA (US)

( * ) Notice: Subject to any disclaimer, the term of this patent is extended or adjusted under 35 U.S.C. 154(b) by 438 days.

This patent is subject to a terminal disclaimer.

(21) Appl. No.: 10/422,329

(22) Filed: Apr. 23, 2003

(65) Prior Publication Data
US 2004/0196150 A1 Oct. 7, 2004

Related U.S. Application Data

(62) Division of application No. 09/798,788, filed on Mar. 2, 2001, now Pat. No. 6,816,077.

(51) Int. Cl.
*G08B 13/26* (2006.01)
(52) U.S. Cl. ............ 340/561; 340/562; 340/501; 340/602; 180/271; 701/45
(58) Field of Classification Search ............ 340/561, 340/541, 602, 501, 667, 562, 436, 438, 604, 340/601, 426.24, 425.5; 180/271, 274, 273; 701/45, 46, 47
See application file for complete search history.

(56) References Cited
U.S. PATENT DOCUMENTS

| | | |
|---|---|---|
| 4,885,566 A | 12/1989 | Aoki |
| 5,164,659 A * | 11/1992 | Schultz et al. ............ 323/351 |
| 5,366,241 A | 11/1994 | Kithill |
| 5,402,075 A | 3/1995 | Lu |
| 5,404,128 A | 4/1995 | Ogino et al. |
| 5,602,734 A | 2/1997 | Kithil |
| 5,691,693 A | 11/1997 | Kithil |
| 5,724,024 A | 3/1998 | Sonderegger et al. |
| 5,802,479 A | 9/1998 | Kithil et al. |
| 5,808,552 A | 9/1998 | Wiley et al. |

(Continued)

FOREIGN PATENT DOCUMENTS

DE  44 17 827  4/1996

(Continued)

OTHER PUBLICATIONS

Joseph A. Paradiso and Neil Gershenfeld, Musical Applications of Electric Field Sensing; Oct. 1995; pp. 1-25.

(Continued)

*Primary Examiner*—Anh V. La
(74) *Attorney, Agent, or Firm*—Brinks Hofer Gilson & Lione

(57) ABSTRACT

A passenger detection system is provided. The passenger detection system utilizes an oscillation circuit that causes an antenna electrode to emit an electric field that is disrupted by the electrical characteristics of an object placed on the seat. This disruption alters the current and phase of the signal in the antenna electrode. By comparing the current flowing in the antenna electrode and/or the difference between the phase of the signal in the antenna electrode and the oscillation circuit output signal with predetermined threshold values, it is possible to detect the presence of a passenger in a reliable and inexpensive manner. Environmental sensors are used to make the determination more accurate. Humidity, moisture and/or grounding condition are detected and used to alter processing, values or calculations.

28 Claims, 6 Drawing Sheets

U.S. PATENT DOCUMENTS

| | | | |
|---|---|---|---|
| 5,844,415 A | 12/1998 | Gershenfeld et al. | |
| 5,844,486 A | 12/1998 | Kithil et al. | |
| 5,878,620 A | 3/1999 | Gilbert et al. | |
| 5,914,610 A | 6/1999 | Gershenfeld et al. | |
| 5,936,412 A | 8/1999 | Gershenfeld et al. | |
| 5,948,031 A | 9/1999 | Jinno et al. | |
| 6,012,007 A | 1/2000 | Furtune et al. | |
| 6,014,602 A | 1/2000 | Kithil et al. | |
| 6,031,761 A * | 2/2000 | Ghilardelli et al. | 365/185.23 |
| 6,043,734 A | 3/2000 | Mueller et al. | |
| 6,043,743 A | 3/2000 | Saito et al. | |
| 6,161,070 A | 12/2000 | Jinno et al. | |
| 6,253,133 B1 | 6/2001 | Sakai et al. | |
| 6,329,913 B1 | 12/2001 | Shieh et al. | |
| 6,329,914 B1 | 12/2001 | Shieh et al. | |
| 6,490,515 B1 | 12/2002 | Okamura | |
| 6,556,137 B1 * | 4/2003 | Oka et al. | 340/561 |

FOREIGN PATENT DOCUMENTS

| | | |
|---|---|---|
| EP | 1 065 097 | 3/2001 |
| JP | 10-236271 | 11/2000 |
| JP | 2000-318568 A | 11/2000 |
| WO | WO 97/39920 | 10/1997 |
| WO | WO 99/05008 | 2/1999 |
| WO | WO 00/44584 | 8/2000 |
| WO | WO 00/50261 | 8/2000 |
| WO | WO 01/04648 | 1/2001 |

OTHER PUBLICATIONS

National Highway Traffic Safety Administration; Notice 1.

National Highway Traffic Safety Administration; Aug. 4, 1998; vol. No. 63, No. 149.

Kazunori Jinno; Occupant Sensing Utilizing Perturbation of Electric Fields; Feb. 1997; pp. 117-129.

J. R. Smith; Field Mice: Extracting Hand Geometry From Electric Field Measurements; 1996; pp. 587-608.

* cited by examiner

POLYURETHANE INSULATOR
5" SPACING BETWEEN ANTENNAE (EXCEPT E SHAPED ANTENNA)

MULTIPLE SENSOR VEHICLE OCCUPANT DETECTION FOR AIR BAG DEPLOYMENT CONTROL

This application is a divisional application of U.S. patent application Ser. No. 09/798,788 filed on Mar. 02, 2001, now U.S. Pat. No. 6,816,077.

REFERENCE TO COMPUTER PROGRAM LISTING

This application includes a computer program listing Appendix A submitted on a compact disc (two copies). The file on the compact discs is 9415-9024 appendix.txt, created Mar. 1, 2001 and having 65,536 bytes. The information on the compact discs, including Appendix A, is incorporated herein by reference.

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

BACKGROUND

The present invention is related to passenger detection systems, and in particular to passenger detection systems that can readily classify an attribute of a passenger of an automobile in which an air bag device is installed.

Air bag devices ease the shock that a passenger experiences during an automobile collision. Air bags are installed in front of the driver's and passenger's seats. Air bags may be installed in other locations, such as to the side of a forward facing passenger.

In a typical air-bag system, the control system includes a control circuit that receives a signal from an electrical acceleration sensor (shock detection sensor), and transmits control signals to the gates of normally-open semiconductor switching elements. The switching elements are respectively connected in parallel paths between a system operating voltage and ground. Each path includes a safing sensor, a squib circuit and the switching element. The squib circuits are connected to the gas sources of the air bag devices.

In operation, the air bag control system only deploys the air bags when both of the safing sensors close, and when the electrical acceleration sensor closes. Current flows from the system operating voltage to ground through each of the squib circuits, thereby causing respective gas sources to deploy (inflate) the air bags.

Many air bags are designed to deploy in front of the torso of an adult passenger seated in the seat. When a rear facing infant seat (hereafter RFIS) is located on the front passenger seat, it is desirable for the passenger-side air bag not to deploy. It may also be desirable for the passenger-side air bag not to deploy for a forward facing child seat (hereafter "FFCS") or child. Likewise, deployment may be limited for side impact airbags based on whether a child or short person is leaning towards the air bag.

Passenger detection sensor types have been proposed for detecting a RFCS, an FFCS or children. Systems using electric fields to detect characteristics of a load in a seat are disclosed in U.S. Pat. Nos. 5,948,031, 6,329,913 and 6,329,914. Other systems using capacitive sensing, such as systems to detect a change in phase or frequency due to the presence of a passenger, have also been proposed. Both types of systems rely on transmission and reception from one or more antenna or electrodes.

Since airbags deploy forcefully and quickly, sensors for correctly determining whether any passenger is in a desirable or undesirable location are desired. Such sensors may prevent injury. By correctly avoiding deployment of the airbag when no passenger is present, replacement costs may be avoided.

SUMMARY

The present invention is defined by the following claims, and nothing in this section should be taken as a limitation on those claims. By way of introduction, the preferred embodiment described below includes multiple sensor vehicle occupant detection for air bag deployment control.

A humidity and/or moisture sensor is used in addition to sensors for detecting the characteristic of a load or passenger. The measurements of the sensors for detecting the characteristic of the passenger are altered to account for humidity in the air or wetness adjacent the electrode. Humidity readings may also be altered based on the wetness adjacent the humidity sensor.

An occupants connection to ground is also used in addition to sensors for detecting the characteristics of a load or occupant. The connection to ground of any occupant is measured using the sensors for detecting the characteristics of the occupant. The measurements relating to characteristics of the occupant are altered in response to the detected level of connection to ground.

In accordance with a first aspect, a vehicle passenger detection system and associated method for sensing a passenger in a passenger seating area is provided. The system includes a passenger detection system and a humidity sensor connected with the passenger detection system. The passenger detection system is responsive to the humidity sensor.

In accordance with a second aspect, another vehicle passenger detection system and associated method for sensing a passenger in a passenger seating area is provided. The system includes a passenger detection system and a moisture sensor connected with the passenger detection system. The passenger detection system is responsive to the moisture sensor.

In accordance with a third aspect, a vehicle passenger detection method and associated system for sensing a passenger in a passenger seating area is provided. The method comprising the acts of: (a) connecting a first electrode to ground; (b) measuring a first signal at a second electrode while the first electrode is connected to ground; (c) disconnecting the first electrode from ground; (d) measuring a second signal at the second electrode with the second electrode is disconnected from ground; and (e) determining a grounded state of the passenger as a function of the first and second signals.

Further aspects and advantages are described below.

BRIEF DESCRIPTION OF THE DRAWINGS

FIGS. 1(a) and 1(b) are diagrams showing the basic operation of a passenger detection system utilizing electric field transmissions, wherein FIG. 1(a) shows an undisturbed electrical field distribution between two electrodes, and FIG. 1(b) shows an electrical field distribution when an object is present between the two electrodes.

DETAILED DESCRIPTION OF THE INVENTION

The Figures show various embodiments that utilize electrodes to detect the presence or characteristics of a passenger. The measurements from the electrodes may be altered in response to humidity and/or moisture sensors. The measurements may also be altered in response to an amount of ground connection to the passenger determined from electrode measurements, such as measurements at different frequencies. The ground, humidity and/or moisture detections account for environmental conditions that change the measurements for passenger detection.

Figure 1A:
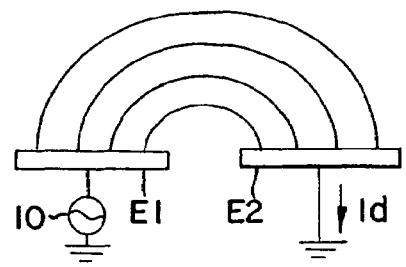
Figure 1B:
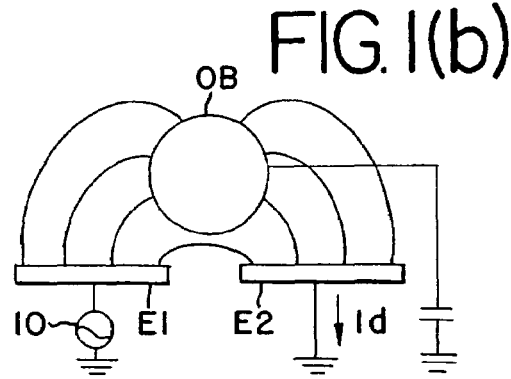

As representing in FIGS. 1(A) and 1(B), minute electric fields between two electrodes positioned in the passenger seat are detected. An electric field is created as a result of the potential difference between the electrodes when a high-frequency, low-voltage signal is applied to one electrode and the other electrode is connected to ground. This electric field produces a current (the receive current) flowing from one electrode (non-transmitting) to ground. If a body (passenger or occupant) is present in the electric field, disturbances in the electric field alter the current. Likewise, a current (the loading current) provided to the transmitting electrode is also altered in response to the presence of the body.

The body acts as a capacitor having one terminal connected to ground. The impedance (resistance and capacitance) of the body shunts the electric field to ground. When the body is in the vehicle seat, changes in the current flowing at the transmitting and any receiving electrodes occur in response to the electrical characteristics of the body. For example, the loading current is larger for closer and/or larger bodies. Using this phenomenon, the presence of a passenger in the seat is detected by comparing the detected current with a known value. In particular, one or more characteristics of the object in the seat are obtained, including whether or not the object is an adult-sized person sitting normally in the seat. By using electrodes at known or predictable different distances from the object, even more information is obtained. Therefore, the presence and location of a passenger in the seat is precisely detected.

Humidity, moisture or grounding detection may provide for more accurate determination of the presence and characteristic of the passenger. One or more of these detected environmental conditions is used to alter the measured currents, an applied algorithm, a calculation, a selected comparison table or other value. Based on experimentation or theory, the effect of humidity, moisture and grounding conditions are removed or reduced from the detection of a passenger.

Figure 2:
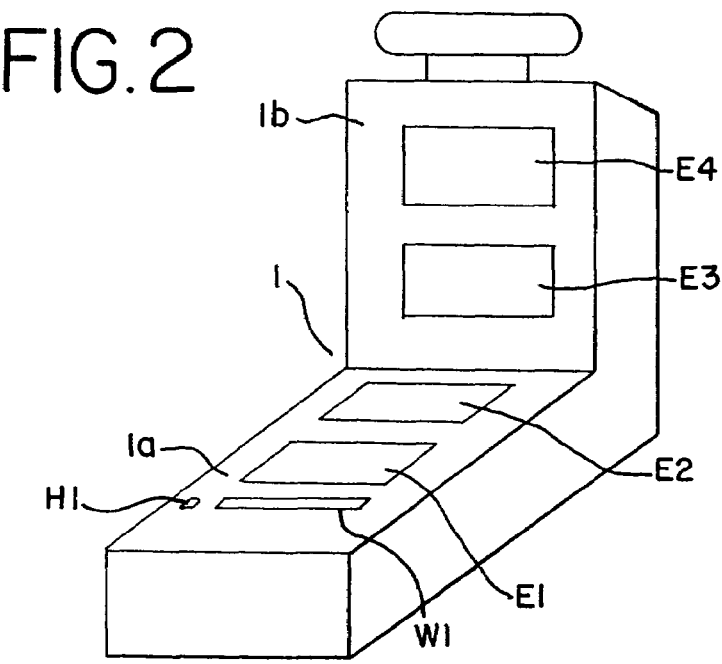
FIG. 2 is a graphical representation of one embodiment of an arrangement of a plurality of electrodes.

FIG. 2 is a perspective view showing a seat 1 incorporating electrodes E1 through E4 of the passenger detection system in accordance with a first embodiment. The electrode E1–E4 are formed from rectangular sheets of conductive material. Each electrode E1–E4 is the same or different shapes than other electrodes, and any shapes may be used, including square, spiral, rectangular, oval, circular, donut shaped, rectangular with a hollow center or other polygonal and/or rounded shapes. The electrodes E1–E4 include metal fibers sewn into the seat cover fabric, conductive paint applied to the surface of the seat, conductive tape, conductive sheets or metal plates installed under the seat cushion.

The electrodes E1 and E2 are mounted on the base portion 1a of the seat 1, and the electrodes E3 and E4 are mounted on the back portion 1b. These electrodes are positioned with respect to anticipated seating positions of a passenger in the seating area, and are mounted to facilitate seating comfort. In alternative embodiments, more or fewer electrodes in the same or different positions may be used, such as using seven electrodes in the seat back portion (e.g. six arranged vertically in the center of the seat back and one on a seat edge nearest the door) with no electrodes on the seat bottom portion or electrodes in the seat bottom portion 1b with no electrodes in the seat back portion 1a. In other embodiments, the electrodes are positioned at other locations within the passenger compartment, such as on the floor, in the dash, in the door, in the roof or combinations thereof. In yet other alternative embodiments, infrared, ultrasonic or other mechanisms for detection the presence and position of an occupant are used.

The seat 1 also includes a humidity sensor H1 and a moisture sensor W1. The humidity sensor H1 and moisture sensor W1 are positioned in the seat 1, such as adjacent one or more of the electrodes E1–E4 within an aperture in the seat foam.

Figure 3:
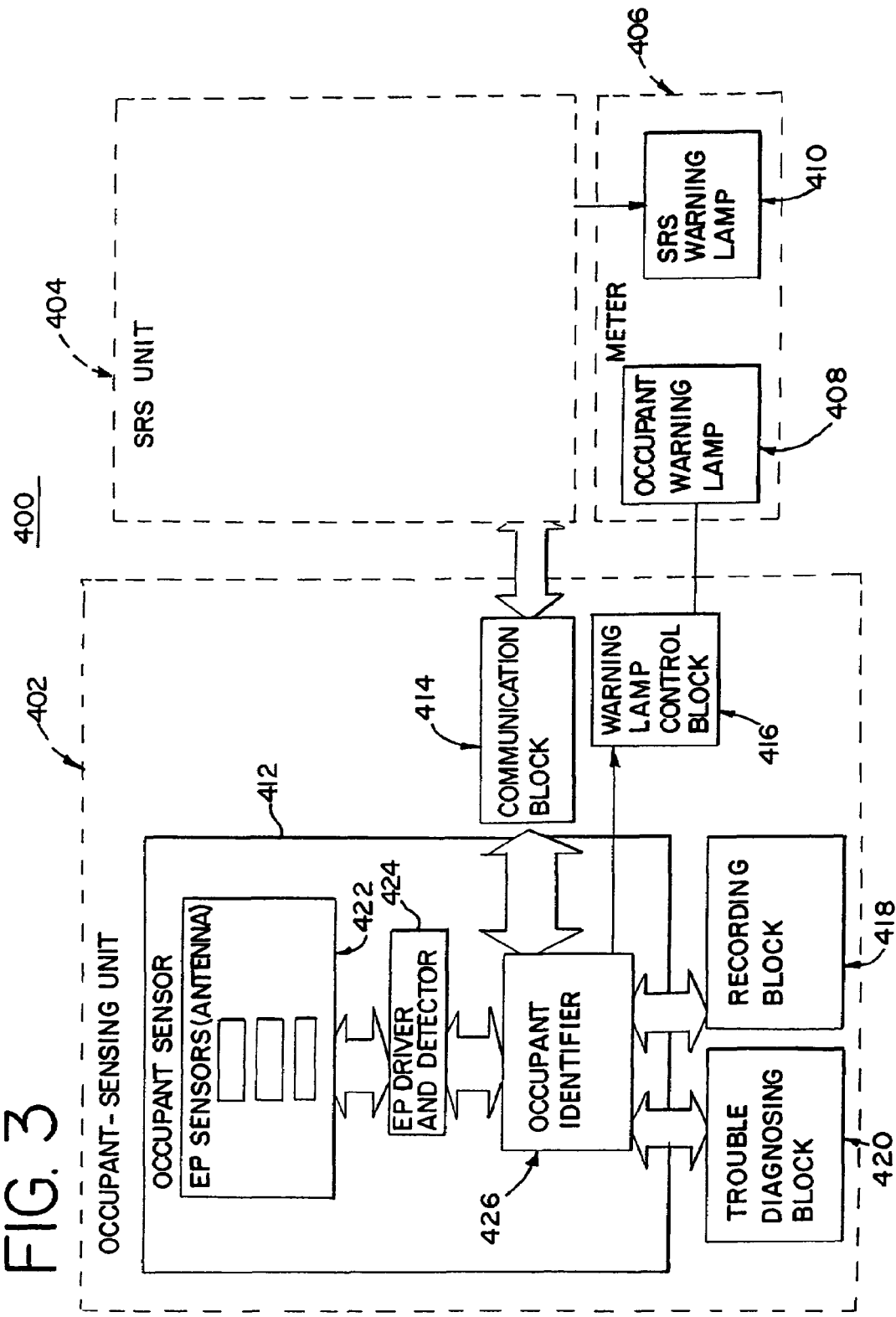
FIG. 3 is a block diagram showing one embodiment of a passenger detection system.

Passenger Detection:

FIG. 3 shows one general embodiment for a passenger detection system 400. The system 400 includes a occupant sensing unit 402, a supplementary restraint system (SRS) 404 and a display meter 406. The occupant sensing unit 402 provides control signals to the SRS 404 to disable or enable air bag activation. A warning lamp signal is provided to a occupant warning lamp 408 of the display meter 406. The occupant warning lamp 408 indicates the classification of the occupant determined by the occupant sensing unit 402. Alternatively, the occupant warning lamp 408 indicates whether the SRS 404 is enabled or disabled. An SRS warning lamp 410 indicates whether the SRS 404 is operative.

The occupant sensing unit 402 includes an occupant sensor 412 for detecting the size and/or sitting posture of an occupant to determine whether to enable the SRS 404 at a low level of power for deployment, a high level of power for deployment or disable the SRS 404. A communication block 414 communicates either bi-directionally or uni-directionally with the SRS 404. A warning lamp control block 416 activates the occupant warning lamp 408 as discussed above. An optional recording block 418 records any failure codes of the occupant sensing unit 402 and/or the various characterizations of any occupant determined by the occupant sensing unit 402. An optional trouble diagnosing block 420 determines whether the occupant sensing unit 402 is operating properly and provides for external communications.

The occupant sensor 412 includes an array of electric field sensors 422, an electric field driver and detector 424 and an occupant identifier 426. The electric field sensors 422 comprise electrodes distributed as discussed above. The electric field driver and detector 424 comprise an oscillator and current measuring circuitry for generating the electric fields with the electric field sensors and measuring receive and/or loading currents, respectively. Receive currents comprise currents generated in an electrode other than the electrode used for transmitting. The loading current comprises a current in an electrode used for transmitting. The occupant identifier 426 comprises a processor or analog circuitry for classifying any occupant as a function of the measured currents.

The system 400 may be implemented with various circuits and/or methods. Some exemplary circuits and method are discussed in U.S. Pat. Nos. 5,948,031, 6,329,913, and 6,329,914, the disclosures of which are incorporated herein by reference. In alternative embodiments, the passenger detection system comprises capacitive, ultrasound, infrared, visible light or other sensing systems for detecting the presence of a passenger.

Figure 4:
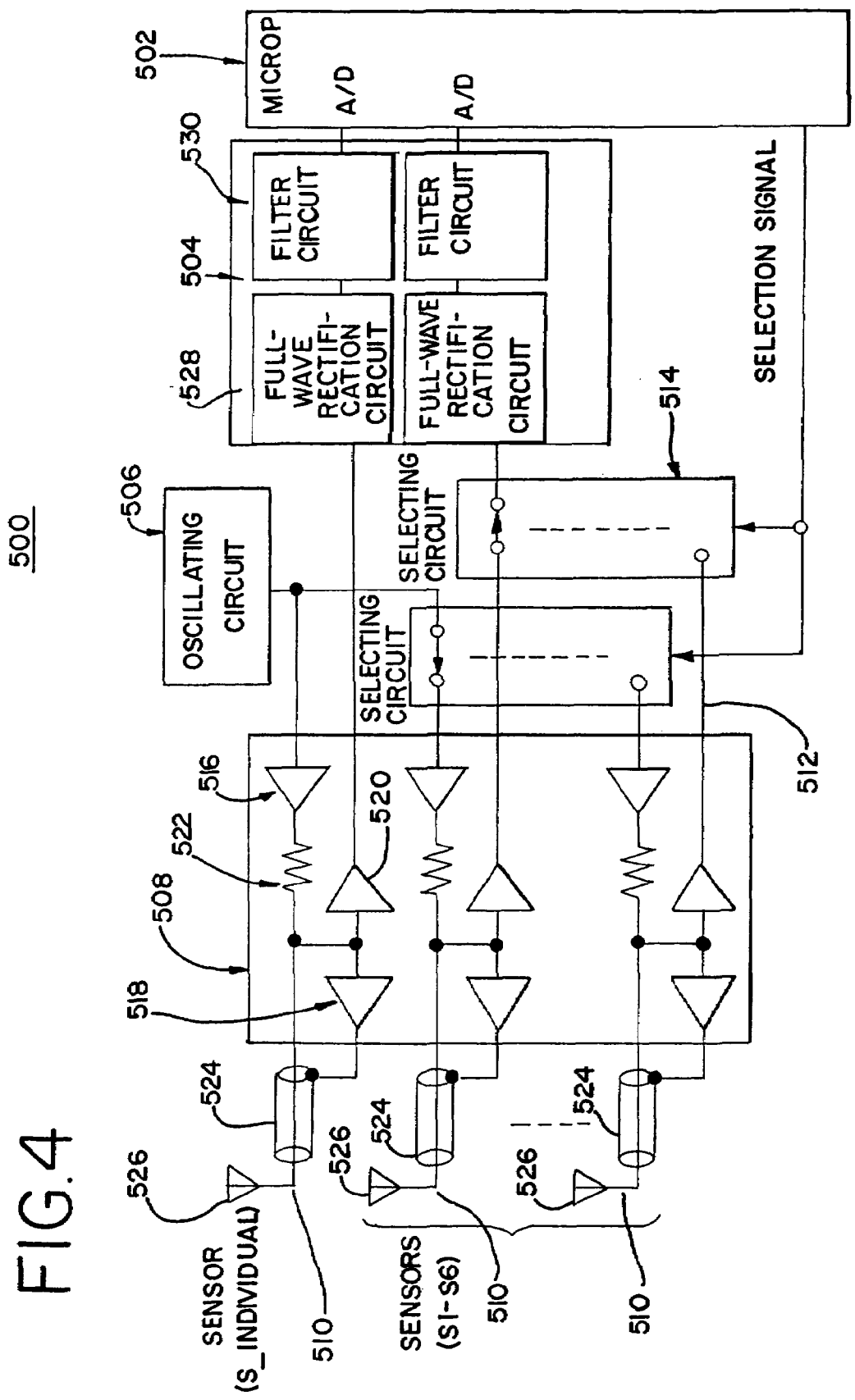
FIG. 4 is a block diagram showing another embodiment of a passenger detection system.

One embodiment of the system 400 of FIG. 3 is shown in FIG. 4. In particular, a system 500 includes a microprocessor 502, a detector 504, a oscillating circuit 506, signal conditioners 508, sensors 510 and selecting circuits 512 and 514.

Two or more paths for generating and detecting the load current are provided. One such path is described below. The other paths comprise the same or different components. In alternative embodiments, one or more of the paths are used for measuring received currents or both loading and receiving currents. In the path, the oscillating circuit 506 comprises an oscillator that generates an AC signal, such as about a 100–120 kHz frequency signal in the range of 5 to 12 volts (e.g. 7 volts) or at another voltage.

The signal conditioners 508 comprise operational amplifiers 516, 518 and 520 and a resistor 522. The operational amplifier 516 connected with the oscillating circuit 506 buffers the signal to provide a constant voltage source. The signal is provided through a shielded cable 524 to an electrode 526 of the sensor 510. An electric field is generated in response to signal. When a load to the sensor 510 increases, the voltage across the resistor 522 increases. The amount of change in the voltage is buffered by the operational amplifier 518 connected with the shield of the shielded cable 524. This operational amplifier 518 preferable has a high input impedance and low output impedance to maintain the voltage level of the shield at the same level as center conductor, shielding the sensor 510 from adjacent conductive materials.

The operational amplifier 520 connected with the detector 504 provides current gain to the loading current. The detector 504 comprises a full-wave rectification circuit 528 and a filter circuit 530. The amplitude or change in amplitude of the loading current is detected by rectifying the output of the operational amplifier 520. The rectified signal is filtered by the filter circuit 530, such as an analog low pass filter.

Two possible embodiments are shown in FIG. 4 for the paths of two or more sensors 510 to the detector 504. In one embodiment, each path includes separate components except for the microprocessor 502 (as represented by the path labeled S-individual sensor). In an alternative embodiment, each path also shares the oscillating circuit 506 and the detector 504. Alternatively, a combination of shared paths and individual paths, as shown, is used. circuits Preferably, shared paths are used. The individual path is removed. The selecting circuits 512 and 514 comprise multiplexors or a shared multiplexor controlled by the microprocessor 502. One selecting circuit connects the oscillating circuit 506 to each sensor path and the other selecting circuit connects the detector 504 to each sensor path. For classification with loading currents, one selecting circuit that connects both the oscillating circuit 506 and the detector 504 to the same path may be used. For classification with receive currents or combinations of both receive and loading currents, the selecting circuits 514 and 512 operate independently.

The output of the detector 504 is connected with the microprocessor 502. The microprocessor 502 comprises an ASIC, processor, digital signal processor or other digital device for generating safety restraint system (SRS) control signals. For example, a PD78052CG(A) microprocessor manufactured by NEC Corporation of Japan is used and includes an analog to digital converter(s).

The microprocessor 502 converts the analog signal to a digital signal. The microprocessor 502 measures the loading and/or receive currents to classify any occupant. Small loading current amplitudes indicate the presence of a load. The amplitude and/or change in amplitude represent changes in the impedance of the load. The load impedance varies as a function of the effective surface of the load (size) and the distance between the load and the electrode 526. Phase or frequency may also be measured to further indicate the impedance of the load.

Based on the resulting digital values, such as 8 bit values, representing the received currents, the microprocessor 502 determines the size, shape, position and/or other characteristic of a passenger. The characteristic is determined as a function of a mathematical algorithm or a comparison. For example, using an EEPROM, RAM or another memory device, the digital values are compared to thresholds or data representing the characteristic based on experimentation.

Figure 5:
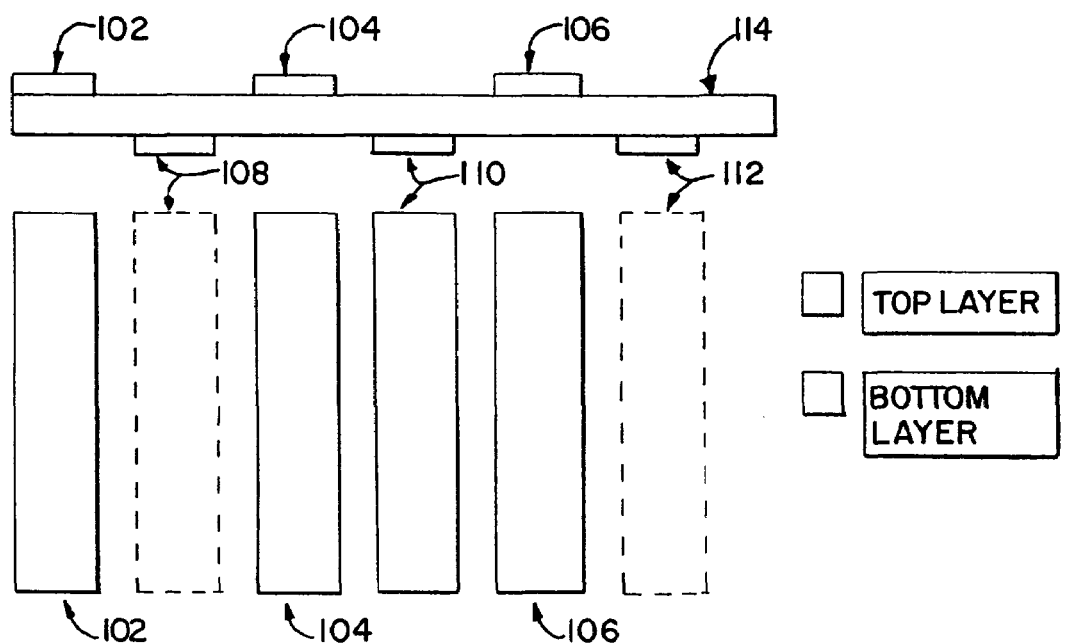
FIG. 5 includes top and side views of one embodiment of an arrangement of electrodes.

The load is characterized as a function of the array of electrodes. Any arrangement of one or more electrodes may be used. FIG. 5 shows one embodiment of an arrangement 100 of electrodes. A plurality of electrodes 102, 104, 106, 108, 110 and 112 are arranged in two layers. The layers are separated by an insulator 114. Preferably, the insulator 114 comprises a seat cushion (e.g. ⅜ inch thick polyethylene foam), a rigid body, air or other devices which are permeable to electromagnetic energy. In this embodiment, the electrodes 102, 104, 106, 108, 110, and 112 comprise a conductive film, but may be a conductive fabric, foil or other conductive material. The electrodes 102, 104, 106, 108, 110, and 112 are connected with a base portion of the seat, such as centered in the base portion and aligned in an array from the front to the back of the seat.

The shape created by the electrodes in each layer may be different. For example, different shaped electrodes are used for each layer. Each layer is preferably in one plane, but may be arranged in a non-planar arrangement. For non-planar arrangements, a phantom layer of electrodes is created as a function of the electrodes used to make a measurement.

The arrangement 100 is connected with the seat by being within the seat, adjacent to the outer surface of the seat or at the outer surface of the seat. The arrangement 100 is thus adjacent to the passenger seating area. The two or more layers are different distances from the outer surface of the seat (i.e. different distances from the passenger seating area).

In one embodiment, the loading currents from a plurality of electrodes are measured. For example, loading currents are measured sequentially from each electrode using the system of FIG. 4. In this example, while the loading current of one electrode is measured, the other electrodes are grounded. Alternatively, one or more of the other electrodes are electrically isolated (not connected to ground).

Figure 6:
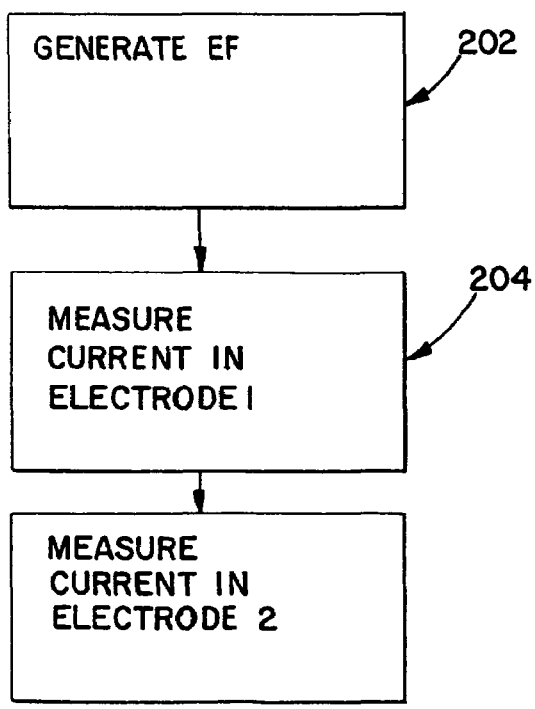
FIG. 6 is a flow chart representing one embodiment of a method of detecting a passenger.

FIG. 6 shows a flow chart of one preferred embodiment for sensing a characteristic of a passenger. This process is repeated in real-time. In act 202, an electric field is generated. For example, an AC signal is provided to one of at least two electrodes at different distances from an outer surface of a vehicle seat. The oscillation circuit 506 (FIG. 4) generates the alternating current (AC) signal having a known voltage amplitude and frequency. The AC signal causes the electrode to emit the minute electric field in the passenger area adjacent to the seat. The electrical characteristics of an object seated or placed on the seat (i.e., in the vicinity of the antenna electrode) disrupt the electric field. This electric field disruption alters the amount of current flowing in the antenna electrode and causes the phase of the AC signal generated on the antenna electrode to differ from the original AC signal generated by the oscillation circuit.

In act 204, the signal at one of the at least two electrodes is measured. For example, the loading current or a received current is detected and converted to a voltage. In the embodiment of FIG. 4, an impedance or resistance element and a differential amplifier (or other amplifier) is used to measure the current in the electrode. One such impedance/resistance element is a RR1220P-103-D, manufactured by Susumukougyou of Japan, that is connected to the electrode. The differential amplifier is connected across the impedance/resistance element and generates the current signal based on the voltage differential across the impedance/resistance element. In particular, the current differential amplifier compares the voltage level of the oscillation circuit output signal with the voltage level generated on the antenna electrode, and generates the current signal that indicates the difference.

Note that the detection current of the current detection circuit increases when a person is seated in the seat. It decreases when luggage is in the seat, or when the seat is empty. In either case, there is a difference in the detected current level between these occupied and unoccupied conditions. The same is true for the phase differential.

In act 205, the signal at the other of the at least two electrodes is measured. For example, the loading current or a received current is detected and converted to a voltage. The measurement at each electrode may be sequential loading current measurements or sequential receive current measurements. Alternatively, a loading current is measured at one electrode and a receive current is measured at the other electrode either simultaneously or sequentially.

The current and/or the phase differential are compared with stored values to accurately identify whether or not an adult passenger is seated in the front passenger seat.

The measured currents are used to determine the height, position, size, orientation, movement and/or other characteristic of a passenger. Other characteristics may be determined, such as disclosed in U.S. Pat. No. 5,914,610, the disclosure of which is herein incorporated by reference. For example, the change in distance R as a function of time shows movement.

Figure 7:
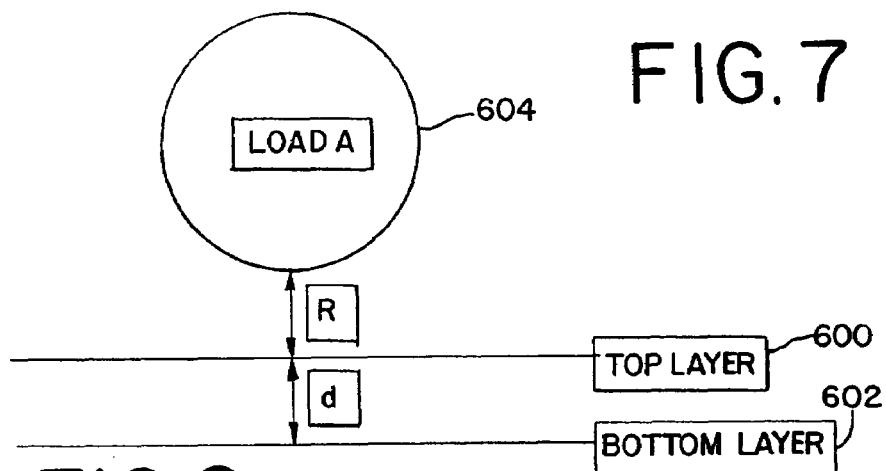
FIG. 7 is a graphical representation of electrode layers positioning relative to a load in one embodiment.

FIG. 7 represents the use of two layers 600 and 602 to determine the size A and distance R of a load 604. For example, the load 604 comprises an occupant on a seat in a passenger seating area. The load 604 is a distance R away from the top layer 600 of electrodes. The top and bottom layers 600 and 602 are separated by a distance d.

With two electrodes separated from the outer surface of the seat by the distance, d, the load A and distance R is determined. The loading current S, load A and distance R are related as represented by $S=K(A/R)$, where K is a constant. Using at least two different loading current measurements, one for the electrode closest to the passenger (e.g. the top electrode)(St) and one for the electrode furthest from the passenger (e.g. the bottom electrode)(Sb), the load and distance are determined as a function of the distance between the electrodes d. Thus, the characteristic of the occupant is determined as a function of the difference in distances between the electrodes from the outer surface of the seat. $St=K1(A/R)$ and $Sb=K2(A/(R+d))$. Solving for A and R, $A=(d*Sb*St)/(St-Sb)$ and $R=(d*Sb)/(St-Sb)$. Thus, the size of the load and distance from the electrodes is determined. In alternative embodiments, the A and R are solved without the scaling distance d and/or as a function of currents received at non-transmitting electrodes.

Preferably, more than two electrodes are used, such as the six electrodes shown in FIG. 5. With an array of electrodes, the distribution of a load is determinable. For example, the load A and distance R are determined using different pairs of electrodes, providing loads and distances adjacent various locations of the array. Using the six electrodes, three different loads and distances are determined. A greater number of electrodes in the array or additionally using received currents in non-transmitting electrodes provide for greater spatial resolution.

In one embodiment, the insulator 114 is soft or semi-rigid, allowing for the distance between electrode layers to vary predictably. For example, the electrodes are positioned on different sides of a cushion or foam insulator. As a result, the distance between the layers varies as a function of the load as represented by $d=f(A)$. The distance varies as a function of the weight of the passenger. In one embodiment, $d=c-kA$ where c, and k are constants determined, at least in part, as a function of the compressibility of the insulator and/or experimentation. Alternative representations of the distance d may be used, such as $d=c-(k1)A-(k2)A^2$, where c, k1 and k2 are constants. Using the equations discussed above, the load and distance from the arrangement 100 is determined as a function of the distance between the electrodes. This may allow for more accurate determination of the load by accounting for the load impact on the system.

Based on the determined load and distance information, the load is characterized. For example, the load is classified as (1) an adult in one or more positions, (2) a child or small adult in one or more positions, (3) a child in a FFCS, (4) an infant in an RFCS, or (5) another object. The classification is preferably determined by comparison to expected measurements. Alternatively, an algorithm that locates a neck of a passenger by determining the distribution of the load is used to classify the occupant as large enough for air bag activation or to small for air bag activation. In yet another alternative embodiment, a function of the measurements determines the classification.

Figure 8:
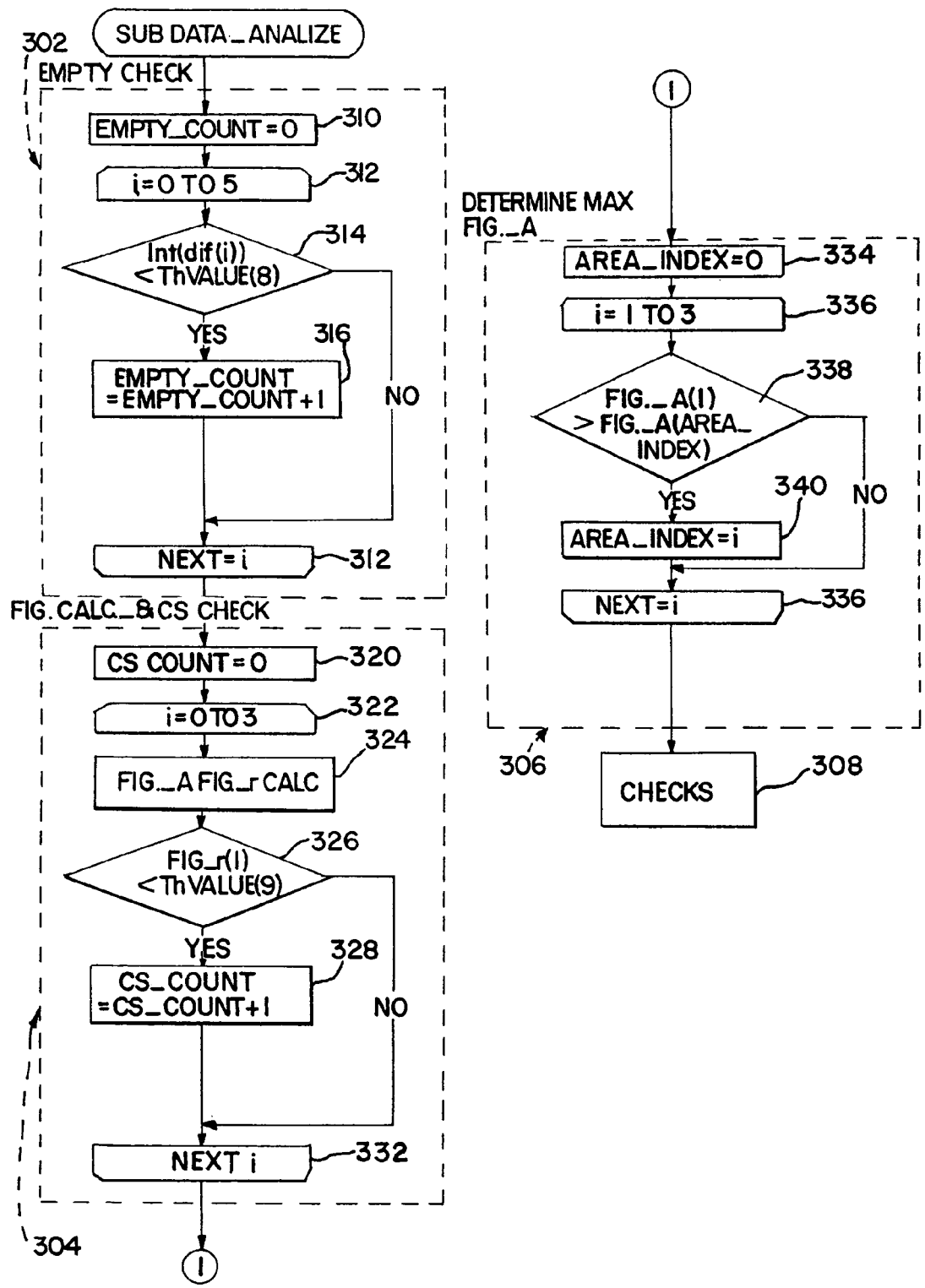
FIG. 8 is a flow chart representing one embodiment of a method for classifying a passenger.

FIG. 8 is a flow chart of one embodiment for using measured signals to enable or disable an air bag system or to provide control signals as a function of the classification. The flow chart is optimized to operate with the electrode arrangement 100 of FIG. 5 positioned in a base portion of the vehicle seat, but other electrode arrangements may be used.

The system determines whether the seat is empty in process 302. In process 304, the system determines whether the seat is occupied by a child seat. In process 306, the system determines whether the seat is occupied by an adult or a child. In process 308, the system performs various cross-checks or further processes to increase reliability for the classification. The processes may be performed in any order or combined, such as performing one or more cross-checks of process 308 as part of one or more other processes 302, 304, and/or 306. Some processes may be skipped in response to the determination made in another processes, such as skipping all other determination after a classification of the seat as empty. Different processes, algorithms, or calculations for classification may be used.

In process 302 for determining whether the seat is empty, the system initializes a count to 0 in act 310. Acts 314 and 316 are repeated for each of the six electrodes (i) as represented by the loop 312. In act 314, the value for each loading current is compared to an empty threshold. If the loading current is above the threshold, the process 302 increments to the next electrode in act 312. If the loading current is below the threshold, an empty count variable is increased by one. Thus, the process 302 provides a count of the number of loading current values at any given time that are lower than the empty threshold. In one embodiment, if any of the loading current values are above the threshold, then the seat is classified as occupied.

In one embodiment for process 302 and/or another processes, the loading currents from two or more electrodes are averaged to represent a phantom electrode loading current. For example in the case of the paired design shown in FIG. 5, four phantom loading currents, two for each layer, are determined by averaging different groupings of electrode loading currents. Labeling the electrodes 102, 104, 106, 108, 110, and 112 as electrodes S1, S2, S3, S4, S5 and S6 (where S1, S3 and S5 comprise a first layer and S2, S4 and S6 comprise a second layer), the four phantom loading currents are calculated as follows:

$$S_{avg}1=(S1+S3)/2$$

$$S_{avg}2=(S2+S4)/2$$

$$S_{avg}3=(S3+S5)/2$$

$$S_{avg}4=(S4+S6)/2$$

In the process 304 for determining whether the seat is occupied by a child seat, the system initializes a child seat count to zero in act 320. Acts 322, 324, 326, and 328 are repeated for each of four sections (i) as represented by the loop 322. The four sections correspond to four unique combinations of at least two electrodes and associated loading current measurements. For example, the four sections comprise loading currents from four combinations of electrodes: (1) electrodes 1, 2 and 3, (2) electrodes 2, 3 and 4, (3) electrodes 3, 4 and 5, and (4) electrodes 4, 5 and 6. Other combinations may be used.

In act 324, the load A and the distance R are determined from the loading currents in a first section. The calculations are determined as discussed above. In one embodiment, the load A calculations are determined as follows:

$$A0=(S_{avg}1*S2)/(S_{avg}1-S2)*(S2)^{-y};$$

$$A1=(S3*S_{avg}2)/(S3-S_{avg}2)*(S_{avg}2)^{-y};$$

$$A2=(S_{avg}3*S4)/(S_{avg}3-S4)*(S4)^{-y}; \text{ and}$$

$$A3=(S5*S_{avg}4)/(S5-S_{avg}4)*(S_{avg}4)^{-y},$$

where a correction factor $(Sb)^{-y}$ is used. Based on experimentation, one preferred value is y=0.4. If any load A is less than or equal to 0, the value is assigned as −1. R is calculated as follows:

$$R0=A0/S_{avg}1;$$

$$R1=A1/S3;$$

$$R2=A2/S_{avg}3; \text{ and}$$

$$R3=A3/S5,$$

Where any distance R value is assigned as 99999 if the corresponding A value is equal to −1.

Preferably, the distance between the layers of electrodes varies as a function of the load. In act 326, the distance R from the electrodes to the load is compared to a child seat threshold. If the distance R is above the threshold, the process 304 increments to the next section in act 322. If the distance R is below the threshold, the child seat count variable is increased by one. Thus, the process 304 counts the number of sections with a distance R at any given time that is higher than the child seat threshold. In other words, the number of sections with distance values corresponding to an object spaced from the seat is determined. In one embodiment, if three of the four sections correspond to distances R that are above the threshold, then the seat is classified as occupied by a child seat. The child seat may be further classified as a FFCS if R1<R2<R3, and as a RFIS if R0>R1>R2 or other methods.

In the process 306 for determining whether the seat is occupied by a child or an adult, the system initializes an area index to 0 in act 334. Acts 338 and 340 are repeated for each of three times for comparison of the load values A for each of the four sections as represented by the loop 336. In act 338, the load of one section is compared to the load of another section, such as comparing the load of a section defined by the loop count of act 336 with the load of a section defined by the area index. For example, the load of section 1 is compared to the load of section zero. If the load of the section defined by the loop count is less than the load defined by the area index, the process 306 increments to the next section and associated loop count in act 336. If the load of the section defined by the loop count is more than the load defined by the area index, the area index variable is set equal to the current loop count variable. Thus, the process 306 determines the maximum load value and associated section. The maximum load value is compared to a threshold to determine whether the load corresponds to an adult or a child.

In one embodiment, the load value A corresponding to the maximum distance value R is excluded for performing the process 306. This exclusion may eliminate false data caused by averaging loading currents from two adjacent electrodes in the phantom loading current embodiment discussed above.

In the process 308, one or more checks and/or other acts are performed to verify and/or limit the classification. For example, the numerical results of the processes 302, 304 and/or 306 are averaged as a function of time. This running average is used to classify any occupant. Alternatively or additionally, the measurements of the loading current are averaged as a function of time prior to comparison to thresholds and/or calculations.

As another example, once the characteristic is classified, the classification is locked for a time period, such as 5 seconds. As the processes 302, 304 and 306 are repeated for different sets of sequential measurements, subsequent different classifications are discarded or averaged and ignored until after a period of time. The classification provided as a control signal is not changed until after the threshold time period. Additionally or alternatively, the classification is not changed unless a certain number of consecutive or substantially consecutive classifications indicate that the characteristic has changed. In an alternative embodiment, a child, RFCS and/or FFCS classification is locked until the vehicle is turned off or an empty classification is determined.

As yet another example, overlapping thresholds are used to prioritize a type of classification. In one embodiment, thresholds are set to more easily change the classification from an adult to a child than from a child to an adult. For example, if the classification is an adult, then the maximum load threshold for classifying the occupant as a child is set higher than if the classification began as a child. Likewise, the threshold or number of sections required for a car seat classification may be different as a function of the most recent prior classification, resulting in prioritizing between an adult and/or a child and a car seat. This prioritization provides a gray zone or area between the thresholds. For example, the lower threshold may be based on the load for an average 6 year old child and the upper threshold may be based on a 5th percentile adult female. Any occupant classified within the gray zone is classified according to the priority, such as classification as a child.

In one embodiment, a check is performed to verify that an adult classification is not the result of a child standing in one spot or a grocery bag on the base portion of the seat. Since the classification as adult is based, in part, on the load at one section or area of the seat, this check verifies that the load is distributed as would be for a sitting adult. Ratios of the maximum load to the load of each adjacent section are compared to a load distribution threshold. For example, if the maximum load $A_{max}$ is the A1 load and (A1>135% of A0 or A2<120% of A3), an "IRREGULAR" classification is used. Likewise, if Amax=A2 and (A2>135% of A1 or A2>200% of A3) or if Amax=A3 and (A3>135% of A2), the condition is also judged as "IRREGULAR." Alternatively, the load for other sections, such as associated with adjacent areas are compared to the same or a lesser load threshold as the maximum load. If the distribution of the load corresponds to an adult, the classification is verified. Otherwise, the classification is changed to a child. Control signals disabling the air bag are provided in response to an irregular classification.

Other checks may be performed. If the maximum load A is the A0 load, the occupant is considered out of position or sitting at the edge of the seat. This classification is considered "IRREGULAR."

Preferably, an LED or other output device is provided to indicate the status of the control signals. For example, the LED is illuminated when the air-bag is disabled.

In one embodiment for use with typical automobile seating materials, the distance between the layers is measured. Automobile seats typically are manufactured, in part, from open-celled polyurethane foam. The foam is used as the insulator between the electrode layers. This approach may allow for improved comfort and allows easier or more convenient molding of the sensors into a seat. Other materials, such as more rigid or softer materials, may be used.

In this embodiment, compression of the insulation layer (e.g. compression of the open-celled polyurethane foam) is accounted for in the calculation of mass A and distance R. Furthermore, the compression may be used to determine a weight W of the occupant. The weight is used for characterization of the load and associated control of the air bag system.

Figure 9:
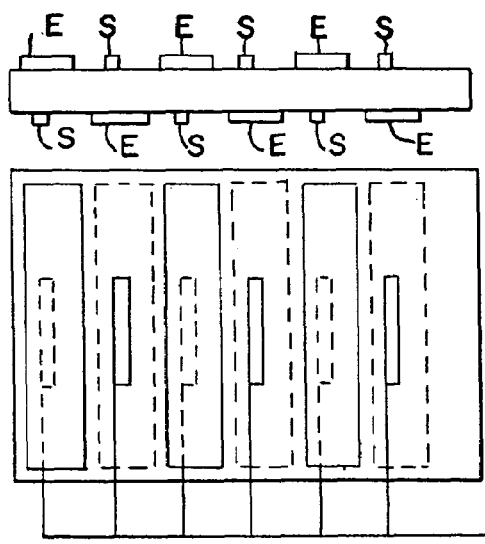
FIG. 9 is a graphical representation of one embodiment of an arrangement of electrodes.

The compression of the insulation layer is accounted for by measuring the distance d between the layers. Sensors S are added to an opposite side of the insulation layer for each electrode as shown in FIG. 9. The thickness of the electrodes is negligible compared to the thickness d of the insulator, but are shown as substantial in FIG. 9 for ease of reference. In alternative embodiments, a sensor S is added opposite to as few as one or a sub-set of all of the electrodes E. For example, the sensors S are placed opposite the top layer of electrodes, but not the bottom layer of electrodes. In alternative embodiments, other electrodes E are used instead of the added sensor S.

The sensors S comprise electrodes, such as metal foil, webbing or other materials as discussed above. Each of the sensors S are of any shape and/or size, including similar or different shapes and/or sizes as the other sensors S or electrodes E. In one embodiment, the sensors S comprise a same shape but smaller area than the respective opposite electrodes. For example, the area of each sensor S is approximately 1/10 of the area of the respective opposite electrode E. FIG. 9 shows such an arrangement. As shown, the sensors S are positioned near the center of the opposite electrodes E, but other relative positions may be used.

The arrangement of sensors S and electrodes E of this embodiment are used to measure the distance d. In a first embodiment, two measurements are taken for at least one of the electrodes E, one where the opposite sensor S is floating (i.e. not electrically connected) and the other where the opposite sensor S is grounded. In a second embodiment, the loading current or other current is measured for the sensor S where the opposite electrode E is grounded.

Referring to this first embodiment, a bottom electrode E is used as an example. The same measurements may be used for others of the electrode-sensor combinations. The float measurement is represented as:

$$B=K(A/(R+d)+S\text{float}/d)$$

where B is the received or loading current of the bottom electrode E (Sb in the similar equations discussed above) and Sfloat represents the load caused by the thickness sensor S in a floating condition. Sfloat is a constant determined as a function of the relative sizes and shapes of the sensor S and opposite electrode E.

The measurement with the sensor S grounded is represented as:

$$Ba=K(A/(R+d)+S\text{gnd}/d)$$

where Ba is the received or loading current of the bottom electrode E (Sb in the similar equations discussed above) and Sgnd represents the load caused by the thickness sensor S in a grounded condition. Sgnd is also a constant determined as a function of the relative sizes and shapes of the sensor S and the grounded connection.

The electrodes are allowed to float or grounded using the switch 702. The switch comprises a transistor, a multiplexer or other switching device, such as described above.

The equations discussed above are combined to provide:

$$Ba-B=K(S\text{gnd}/d-S\text{float}/d).$$

Sfloat is preferably small. For example, the sensor S has the smaller area as discussed above, allowing Sfloat to be factored out of the determination. The combined equation then becomes:

$$Ba-B=K(S\text{gnd}/d) \text{ or } d=K(S\text{gnd}/(Ba-B))$$

To calculate A and R, measurements, T and B, for top and bottom electrodes are obtained. Additional measurements using the sensors S may be used. Solving for the top and bottom electrodes E:

$$T=K(A/R) \text{ and } R=K(A/T)$$

$$B=K(A/(R+d))$$

By solving for A:

$$A=\text{Const.}*(TB/(T-B))*(Sgnd/(Ba-B))$$

Likewise, R is solved for as discussed above using (Sgnd/(Ba−B)) for the distance d. A and R are used as discussed above to characterize any occupant and control the air bag or other system. The constant in the equation for A or R is determined through experimentation and may account for any of the factors discussed herein.

Further variables may be used, such as multiplying the equation by $B^{-y}$ to compensate for the compression where the distance d is not measured. 0.4 was chosen for y by experiment. Preferably, the distance is measured as discussed herein. In other alternative embodiments, Sfloat is assumed to be significant and used to calculate A and R.

Figure 10:
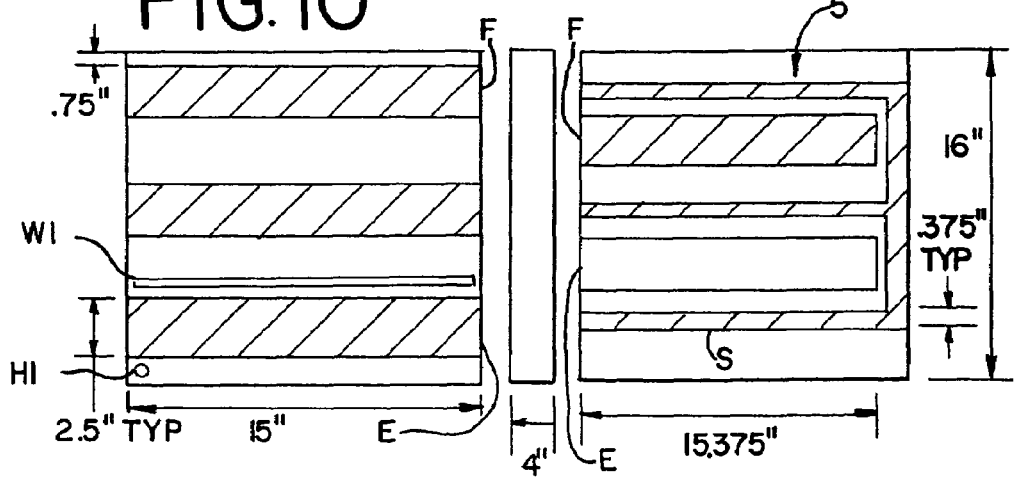
FIG. 10 is a graphical representation of another embodiment of an arrangement of electrodes.

In the second embodiment for measuring the distance d, the sensor S is connected with an oscillating signal. One embodiment of the sensor S configuration is shown in FIG. 10. Other configurations may be used, such as described above or as shown in FIG. 9. FIG. 10 shows three top electrodes E and two bottom electrodes E. Three sensors S positioned opposite the top electrodes E are electrically connected together. In alternative embodiments, the sensors S are electrically independent.

Sequentially with the electrode measurements as described above, the sensors S are used to measure the thickness d. For example, the sensors S are connected to an oscillating signal and the opposite electrodes E are connected to ground. By grounding the electrodes E, the impact of the current caused by any occupant is minimized.

The loading current is measured. The loading current of the sensors S is larger for a lesser distance d. Using experimentally determined values, the loading current is matched with a corresponding distance. The distance is used in the equations discussed above to solve for A and R.

Example software code for implementing this embodiment using an 8 bit microcomputer is attached as appendix A. The code comprises Visual Basic code. Within the code of Appendix A, ch(x) represents the present output reading (in bits) where x is the channel number described within, and sys_const(y) represents the unloaded output reading (in bits) where y is the channel number described within. Also, Th Values represent a value experimentally determined, such as a threshold or insulator thickness. For the example code of Appendix A, the system performs the following functions in a serial manner: 1) output readings are converted to voltages and compensated for cable length, 2) calculations are performed to check for grounded occupant condition, 3) the complex impedance of the load is calculated using the two-frequency data, 4) distance (d) associated with electrodes is calculated, 5) the effective surface area (A) of the load is calculated, 6) the distance (R) of load over the top-layer electrodes is calculated, 7) judgement parameters to be used for occupant classification (e.g., average of effective surface areas, maximum of effective surface areas, total capacitance of load, etc.) are calculated, and 8) the judgement parameters are used to classify the occupant based on predetermined thresholds.

In one embodiment, the distance d is used to determine a corresponding weight of an occupant. The amount of compression represents a weight being applied by the occupant. The relationship is experimentally determined as discussed above. A small distance d indicates a heavier occupant.

In one embodiment, the distance is determined as a function of measurements before and after a load is applied to the seat (i.e. before and after an occupant occupies the seat). For example, the capacitance between the sensors and the electrodes is assumed to be linear as a function of distance. Using the sensor arrangement of FIG. 10, the no load voltage, $V_t$, for the sensors is equal to $k*3S/d_0$, and the load voltage, $V_L$, for the sensors S is equal to $k*3S/d_L$, where $d_0$ and $d_L$ are the no load and loaded distances, respectively, S is the effective surface area of the electrodes opposite the sensor, and k is a constant. Solving for $d_L$, $d_L=d_0(V_L/V_t)$. This overall thickness of the insulator under loading conditions may be used to determine overall A, R and/or weight values.

The weight or distance is used with the A and R values to characterize the occupant and control the air bag system. For example, thresholds and logic relationships are applied to each variable (e.g. W, R and A) to determine the characteristic, such as size and position of any occupant. The weight W may indicate whether an occupant is an adult or small adult/child.

As another example, a weighted combination of two or more of these variables is used. Various combinations may be used, such as based on experimentation. For example, a weighted sum of ⅓W+⅓Amax+⅓Aavg is compared to a threshold to determine whether any occupant is an adult or small adult/child. R is used logically to determine whether a child booster seat is being used. Other functional relationships or calculations may be used.

In a further embodiment, weight distribution across the electrode array is determined, or separate A, R or d values are determined for particular sections of the seat. For example, using the sensor arrangement of FIG. 10, distances d2, d3, d4, d5 and d6 correspond to a respective five electrodes. Where $Cap_{1-2}$, $Cap_{1-4}$ and $Cap_{1-6}$ are the capacitance change associated with electrodes 2, 4 and 6, respectively, the measured channel 1 sensor voltage or associated current $CH_1$ equals $Cap_{1-2}+Cap_{1-4}+Cap_{1-6}$ since the change in capacitance is represented by current differences. $Cap_{1-2}$ equals $kS(1/d2-1/d_0)$; $Cap_{1-4}$ equals $kS(1/d4-1/d_0)$; and $Cap_{1-6}$ equals $kS(1/d6-1/d_0)$. Assuming that $Cap_{1-2}$, $Cap_{1-4}$ and $Cap_{1-6}$ equal or approximate to the voltage or current at each respective channel $CH_2$, $CH_4$, and $CH_6$ and defining a total channel voltage $CH_T$ as equal to $CH_2+CH_4+CH_6$, d2 equals $(CH_T*d_0)/(CH_T+m*CH_1*CH_2*d_0)$; d4 equals $(CH_T*d_0)/(CH_T+m*CH_1*CH_4*d_0)$; and d6 equals $(CH_T*d_0)/(CH_T+m*CH_1*CH_6*d_0)$, where m is a constant. d3 and d5 are assumed to be the average of the distances of associated with adjacent electrodes. A and R values may be determined separately for each section as well.

The separate A, R and/or d values for sections of the seat are used to characterize the load. For example, the values are used to determine which thresholds or algorithms to apply, to designate a distribution of the occupant, to calculate maximums, minimums or averages, to allow comparisons for occupant characterization or to correct other values or other uses (see Appendices A and B). The weight distribution as a function of the distance distribution may be used to further characterize the occupant.

Any one or more of the various measurements, calculations or determinations may be responsive to environmental conditions within the passenger compartment. The passenger detection system is responsive to detection of one or more environmental conditions, such as the grounding state of the passenger, humidity and moisture.

Grounding Condition Detection:

In the impedance based passenger detection system described above, unused electrodes are grounded during loading measurements. Capacitive sensing passenger detection systems may also ground unused electrodes. To account for different grounding states of a passenger, an additional measurement is made with the unused electrodes disconnected from ground.

A first electrode is connected to ground while a signal is measured at a second electrode. The switch or multiplexer 514 (FIG. 4) connects the electrode to ground. A loading or receiving current is measured at the second electrode. For example and referring to FIG. 5, a loading current is measured at one electrode 102, 104, 106, 108, 110 or 112 while the other electrodes are grounded. Where a sensor S (see FIGS. 9 and 10) is provided, the sensor is connected with the oscillating signal supplied to the electrode. Alternatively, the sensor is grounded or allowed to float.

The first electrode is then disconnected from ground, allowing the first electrode to float (i.e. not be electrically connected). For example, the switch or multiplexer 514 (FIG. 4) is opened. In alternative embodiments, the first electrode is disconnected from ground and connected to the oscillating circuit 506 (FIG. 4) or another signal source. For example, the same oscillating signal is applied to both the first and second electrodes. A loading or receiving current is measured at the second electrode while the first electrode is disconnected from ground. Where a sensor S (see FIGS. 9 and 10) is provided, the sensor is connected with the oscillating signal supplied to the electrode. Alternatively, the sensor is grounded or allowed to float.

The above connection and disconnection with associated measurements sequence may be repeated for measurements at each electrode. For example, two measurements are made for each electrode, one with one or more other electrodes grounded and one with the one or more other electrodes disconnected from ground. In alternative embodiments, the connection and disconnection with associated measurements sequence is performed for one or a subset of all of the electrodes.

The two measurements of the sequence are compared. Measurements associated with the same ground connection of other electrodes may be averaged or combined. Such similar measurements from different electrodes may also be averaged or combined.

If two measurements associated with different ground connections are substantially the same, the passenger is properly grounded. If the two measurements are substantially different, the passenger is not grounded. Substantially different values comprise values that correspond to grounding levels that result in different passenger characteristic determinations based on experimentation with the passenger detection system. In one embodiment, substantially different values comprises values about 5–100% different from each other, preferably 50–100%, and even more preferably 75–100%. In alternative embodiments, two or more thresholds associated with three or more levels of grounding are provided.

Where the passenger is determined to be properly grounded, the measurements obtained when other electrodes are grounded are used to characterize the passenger as discussed above. Where the passenger is determined to be not grounded or partially grounded, signals, algorithms, table values, calculations or another parameter are altered to account for the decreased impedance effects of the passenger. For example, the signal values measured are multiplied by a weight or a table used for detecting a passenger is selected as a function of the grounding state. The weight may be applied selectively, such as just to signal values used for passenger detection (e.g. signal values associated with grounding of other electrodes) or to a sub-set of such signal values.

In an example for the embodiments of FIGS. 5, 9 and 10, measured values for electrodes on a layer closest to the passenger seating area are multiplied by one weight and measured values for electrodes on a layer further from the passenger seating area are multiplied by another weight. In one embodiment, a lesser weight, such as ⅔, is applied to the upper layer measurements, and a greater weight, such as 9/10, is applied to the lower layer measurements. Other weights may be used and other functions in addition or as an alternative to multiplication may be used.

Humidity Detection:

The passenger detection system may be sensitive to humidity. Referring to FIGS. 2 and 10, a humidity sensor H1 detects humidity levels. The passenger detection system is responsive to the humidity sensor, accounting for humidity effects on the detection of a passenger.

Figure 11:
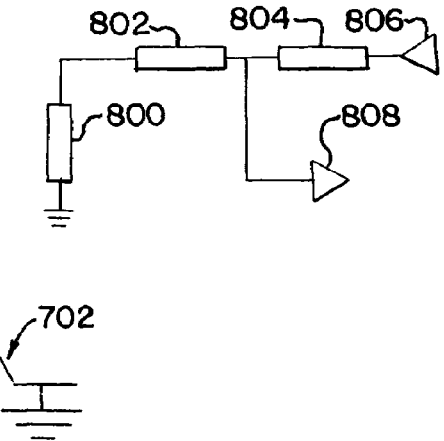
FIG. 11 is a circuit diagram of one embodiment of a receiver channel with a humidity sensor.

FIG. 11 shows the humidity sensor circuit that connects with the oscillating circuit 506 and detector 504 (FIG. 4). A channel in addition to the channels for the electrodes is provided for the humidity sensor 800 connection with the microprocessor 502. The humidity sensor 800 is connected as an electrode or antenna in the passenger detection system 500. The humidity level is measured sequentially in each cycle of measuring current in each electrode or more or less frequently.

The humidity sensor circuit includes the humidity sensor 800, resistors 802 and 804 and buffers 806 and 808. The transmit buffer 806 connects with the oscillating circuit or another signal source, and the measurement buffer 808 connects with the detector 504.

The humidity sensor 800 comprises a capacitive type humidity sensor. For example, the humidity sensor 800 comprises a solid state capacitive humidity sensor that operates in response to an oscillating drive signal. Other types of humidity sensors may be used. The humidity sensor 800 is positioned between the seat trim and the cushion foam to sense the amount of water vapor or liquid in the trim, seating area or passenger compartment. In one embodiment, the humidity sensor 800 is positioned adjacent to at least one electrode. In alternative embodiments, the humidity sensor 800 is positioned in an aperture in the seat foam, beside the seat or at another location within the passenger compartment. In yet another alternative embodiment, the humidity sensor 800 comprises a humidity sensor positioned within an air processing (e.g. air heating or conditioning) unit.

A signal, such as an oscillating signal, is applied to the humidity sensor 800 from the transmitting buffer 806. The oscillating signal is periodically provided to the transmitting buffer 806 at any frequency, such as 120–125KHz.

The resistors 802 and 804 comprise a voltage divider and are connected in series between the humidity sensor 800 and the transmitting buffer 806. In one embodiment, one or both of the resistors 802 and 804 comprise thermisters for temperature compensation. The voltage drop across the resistor 802 adjacent the humidity sensor 800 is provided to the measuring buffer 808. The voltage drop corresponds to the current in the humidity sensor 800. Thus, the voltage divider, the measuring buffer 808 and the detector 504 comprise a voltage detector, but other voltage detectors may be used. In one embodiment, the resistor 802 connected to the humidity sensor is a 1K ohm resistor, and the resistor 804 connected to the transmitting buffer 806 is a 10K ohm resistor. Other resistors or circuits may be used for measuring the humidity level.

The detector 504 converts the output of the measuring buffer 808 to a DC voltage representing the RMS value of the current in the humidity sensor 800. In one embodiment, an absolute humidity is calculated from the measured humidity level and a temperature measurement. Using output from a thermometer positioned within the passenger compartment, the microprocessor 502 calculates the absolute humidity. In alternative embodiments, the measured humidity level from the detector 504 is used alone or combined with other values.

Measured values, algorithms, processes or tables are altered or selected as a function of the humidity level. For example, a plurality of tables, such as twenty tables, associating measured currents to the presence or characteristic of a passenger are provided. Each table corresponds to a different humidity level or range of levels as a function of the relationship between humidity and measuring capacitance or impedance. As another example, the measured values representing the current at the electrode are altered as a function of the humidity level. In one embodiment, the values are altered by about 5% for maximum humidity given a temperature between 10 and 50 degrees Celsius. Other amounts of alteration may be provided. The resolution and associated amounts of alteration or table selections is based on the experimental or theoretical relationship of humidity to measured value.

Moisture Detection:

The passenger detection system may be sensitive to liquid adjacent to the antenna, electrodes or other sensors. One or more moisture sensors are provided. The passenger detection system is responsive to the moisture sensor, accounting for a liquid's effects on the detection of a passenger.

In one embodiment, a moisture sensor separate from the electrodes of the passenger detection system is provided. Referring to FIGS. 2 and 10, the moisture sensor W1 detects moisture levels. The moisture sensor W1 comprises two electrodes separated by cloth or other moisture absorbing or holding material. For example, two rectangular electrodes are separated by 1 mm of cloth tape. In an alternative embodiment, one of the two electrodes of the moisture sensor W1 comprises one of the electrodes of the passenger detection system. Other moisture sensors may be used. The moisture sensor W1 is positioned within the fabric covering of the seat 1, on a top or bottom surface of the seat insulator or within the insulator. In one embodiment, the moisture sensor W1 is positioned adjacent to one or more of the electrodes of the passenger detection system.

The resistance between the two electrodes of the moisture sensor W1 is measured. For example, a oscillating or DC signal is applied and a voltage drop is measured. The resistance changes as a function of the amount of moisture or liquid absorbed between the two electrodes.

In alternative embodiments, the moisture sensor comprises one or more of the same electrodes used for detecting the presence of an occupant. To detect moisture, measurements responsive two different transmission frequencies are made. For example, loading or receiving measurements responsive to sequential transmission of 125 KHz and 90 KHz are made. Non-transmitting or non-receiving electrodes are grounded during the measurements.

The phase angle delay of each measurement relative to the transmitted waveform is calculated by the microprocessor 502 or another digital or analog device. For example, the following equations are used:

$$\cos \Theta_1 = \left( \frac{V_{i1}^2 * V_{o2}^2 * \omega_2^2 - V_{i2}^2 * V_{o1}^2 * \omega_1^2}{V_{i1}^2 * V_{o2}^2 * \omega_2^2 - V_{i1}^2 * V_{o2}^2 * \omega_1^2} \right)^{1/2}$$

$$\cos \Theta_2 = \left( \frac{V_{i1}^2 * V_{o2}^2 * \omega_2^2 - V_{i2}^2 * V_{o1}^2 * \omega_1^2}{V_{i2}^2 * V_{o1}^2 * \omega_2^2 - V_{i2}^2 * V_{o1}^2 * \omega_1^2} \right)^{1/2}$$

where $V_{i1}$ and $V_{o1}$ are the measured voltages responsive to the lower frequency transmission, $V_{i2}$ and $V_{o2}$ are the measured voltages responsive to the higher frequency transmission and $\omega_1$ and $\omega_2$ are the transmission frequencies.

The resistance R between the electrode associated with measurements and other grounded electrodes is calculated as a function of the phase angle:

$$R = \frac{V_{o1} * R_o}{V_{i1} * \cos \Theta_1 - V_{o1}} = \frac{V_{o2} * R_o}{V_{i2} * \cos \Theta_2 - V_{o2}}$$

where $R_o$ is the output impedance of the channel associated with the measuring electrode. The capacitance may likewise be solved:

$$C = \frac{V_{i1} * \sin \Theta_1}{V_{o1} * R_o * \omega_1} = \frac{V_{i2} * \sin \Theta_2}{V_{o2} * R_o * \omega_2}$$

The resistance or resistance change between electrodes indicates a moisture level associated with the electrode. If the resistance change exceeds a threshold, the electrodes of the passenger detection system are considered as wet. In one embodiment, the moisture level is measured separately for each electrode of the passenger detection system. In alternative embodiments, one or a sub-set of the electrodes are used.

Determining the presence of a passenger is responsive to the measured moisture. The microprocessor 502 or another analog or digital device implements changes as a function of the measured moisture. In one embodiment, a fault signal is generated in response to a moisture level above a threshold. The detection of the presence of the passenger is determined as faulty as a result of the amount of moisture. In another embodiment, any of the values, algorithms, tables or calculations discussed above for detecting the presence of a passenger are altered or selected as a function of the detected moisture level. The type or amount of alteration is based on experimentation showing the effects of moisture level on detection of the passenger.

The present invention is not limited to the embodiments provided above. For example, the frequency of the signal output from the oscillator can be other than 120 kHz, depending on the object to be detected. In addition, the voltage amplitude of the signal can be outside the range of 5 to 12 volts, and the output wave form can be a wave form other than a sine wave. The electrodes may be positioned in different locations adjacent to the passenger seating area, such as in the roof liner, on the floor, in the seat back, on the dash board and/or on the seat in front of a back seat. The system may be used to operate with one or more of many different systems, including front impact air bags, side impact airbags, seat belt controls, temperature controls and other devices of a vehicle. The measurements, whether loading currents, received currents or combinations thereof, may be used with any of various algorithms to classify the passenger. The system may also be used for other applications, such as hospital beds for controlling devices dependent upon the characteristics of an occupant. More than two layers of electrodes may be used. Any combination of no, one or more environmental sensors and associated measurement sequences may be used.

While various embodiments have been described herein, changes and modifications may be made without departing from the scope of the invention which is defined by the following claims and equivalents thereof.

What is claimed is:

1. A vehicle passenger detection method for sensing a passenger in a passenger seating area, the method comprising the acts of:
   (a) connecting a first electrode to ground;
   (b) measuring a first signal at a second electrode while the first electrode is connected to ground;
   (c) disconnecting the first electrode from ground;
   (d) measuring a second signal at the second electrode with the first electrode disconnected from ground; and
   (e) determining a grounded state of the passenger as a function of the first and second signals.

2. The method of claim 1 wherein (c) comprises allowing the first electrode to float.

3. The method of claim 1 wherein (c) comprises applying a signal to the first electrode.

4. The method of claim 3 further comprising:
   (f) applying an oscillating signal to the second electrode during (d); wherein (c) comprises applying the oscillating signal to the first electrode.

5. The method of claim 1 further comprising:
   (f) repeating (a)–(d) for different combinations of electrodes.

6. The method of claim 1 wherein (b) and (d) are sequentially performed.

7. The method of claim 1 wherein (e) comprises comparing the first signal to the second signal.

8. The method of claim 7 further comprising:
   (f) altering the first signal when the first signal is substantially different than the second signal.

9. The method of claim 8 wherein (f) comprises altering as a function of a distance from the second electrode to the passenger seating area.

10. The method of claim 7 wherein (e) comprises determining that the passenger is grounded where an amplitude of the first signal is substantially the same as the amplitude of the second signal.

11. The method of claim 7 further comprising:
    (f) selecting a table when the first signal is substantially different than the second signal.

12. The method of claim 1 further comprising:
    (f) measuring one of: a humidity and a moisture; and
    (g) determining a presence of the passenger in the passenger seating area as a function of the grounded state of the passenger and the one of the humidity and the moisture.

13. A vehicle passenger detection system for determining a ground state of a passenger in a passenger seating area, the system comprising:
    first and second electrodes;
    a sensor comprising at least the second electrode, the first electrode unused by the sensor;
    a switch operable to connect the first electrode to ground; and
    the sensor comprising a means for measuring first and second signals at the second electrode when the first electrode is connected to ground and when the first electrode is disconnected from ground, respectively.

14. The system of claim 13 wherein the switch is operable to connect the first electrode to ground and to open the connection between the first electrode and other electrodes.

15. The system of claim 13 wherein the switch is operable to connect the first electrode to ground and to an oscillator.

16. The system of claim 13 further comprising a processor connected with the means for measuring, the processor operable to compare the first signal with the second signal.

17. The system of claim 13 further comprising:
    an additional sensor selected from the group consisting of: a moisture sensor and a humidity sensor, wherein the passenger detection system is responsive to the additional sensor and the means for measuring.

18. A vehicle passenger detection system for detecting a passenger in a passenger seating area, the system comprising:
    first and second electrodes;
    a signal source connected with the second electrode or a third electrode;
    a switch operable to connect the first electrode to ground;
    a means for measuring first and second signals at the second electrode when the first electrode is connected to ground and when the first electrode is disconnected from ground, respectively, the signal source connected with the second or third electrode for measurement of the first and second signals; and
    a processor operable to detect a passenger as a function of the first and second signals.

19. The system of claim 18 wherein the processor is operable to determine whether the seating area is occupied by a person.

20. The system of claim 18 wherein the processor is operable to determine whether an adult passenger is in the seating area.

21. The system of claim 18 wherein the processor is operable to distinguish between a person and an object.

22. The system of claim 18 wherein the first and second electrodes are positioned in a single layer relative to the passenger seating area.

23. A vehicle passenger detection method for sensing a passenger in a passenger seating area, the method comprising the acts of:
    (a) connecting a first electrode to ground;
    (b) measuring a first signal at a second electrode while the first electrode is connected to ground;
    (c) disconnecting the first electrode from ground;
    (d) measuring a second signal at the second electrode with the first electrode disconnected from ground; and
    (e) measuring for passenger detection as a function of the first and second signals
    wherein the first and second signals are measured without the first electrode being used for transmit or receive operation.

24. The method of claim 23 wherein (e) comprises determining an occupied or unoccupied state of the seating area.

25. The method of claim 24 wherein (e) comprises determining whether the seating area is occupied by a person.

26. The method of claim 23 wherein (e) comprises determining whether an adult passenger is in the seating area.

27. The method of claim 23 wherein (e) comprises distinguishing between a person and an object.

28. The method of claim 23 wherein (a)–(d) comprise using the first and second electrodes positioned in a single layer relative to the seating area.

* * * * *